Oct. 19, 1971     P. K. BODGE     3,613,450

FLUID MASS FLOWMETER

Filed April 2, 1968     3 Sheets-Sheet 1

INVENTOR
PHILIP K. BODGE
BY
Thomson & Mrose
ATTORNEYS

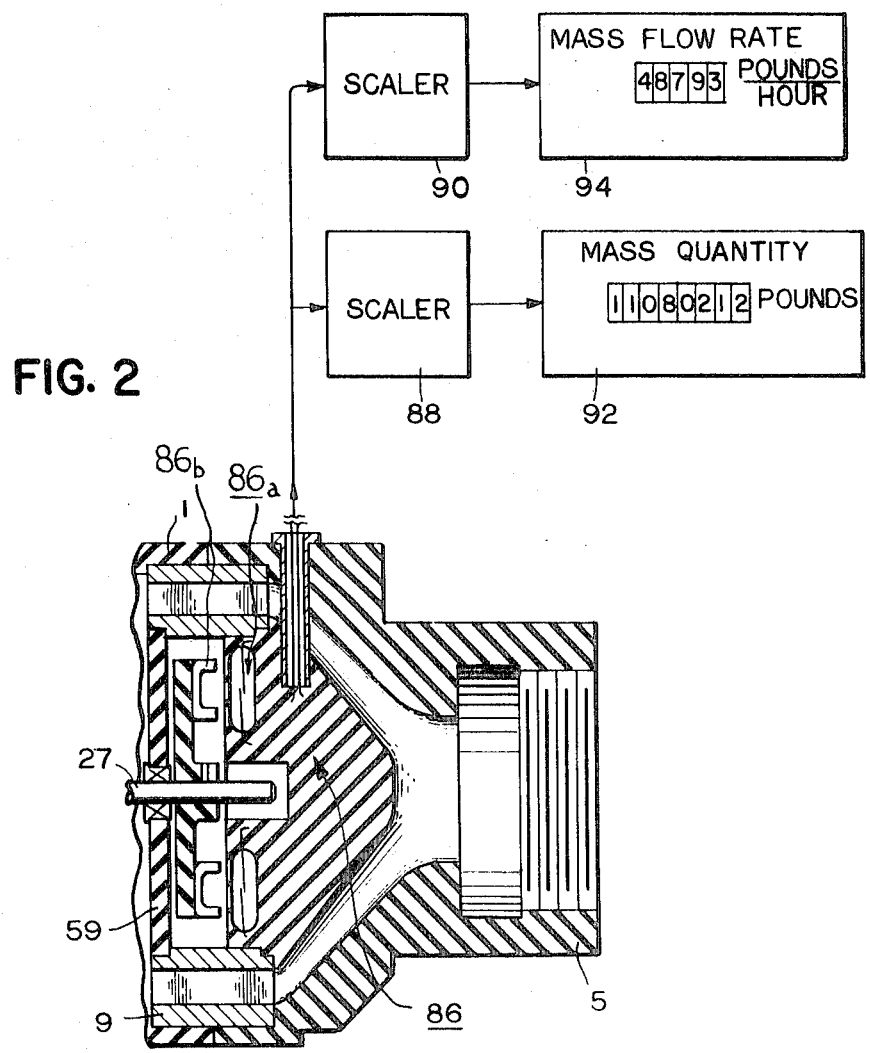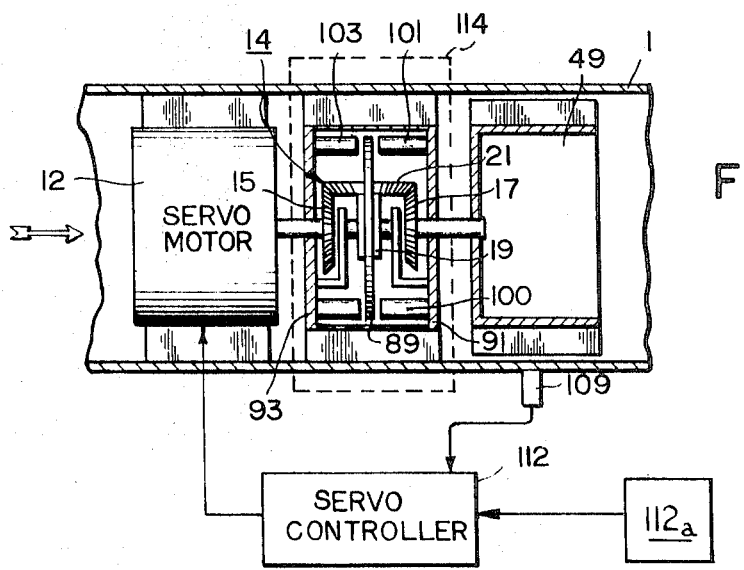

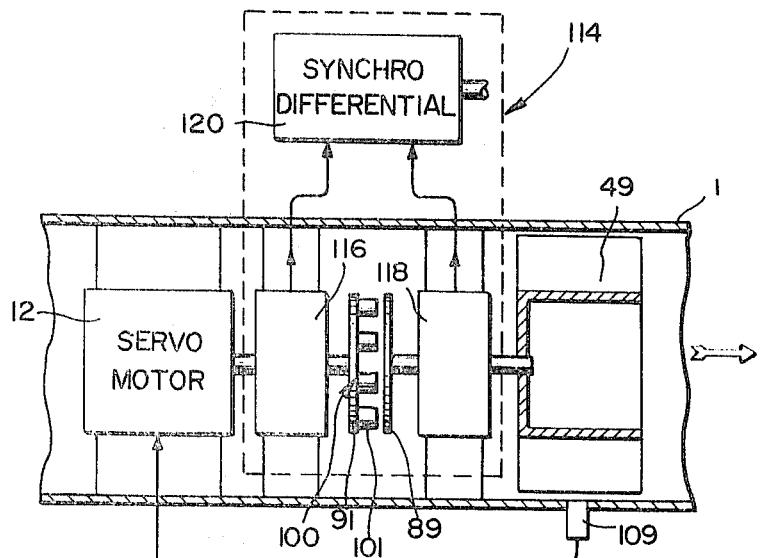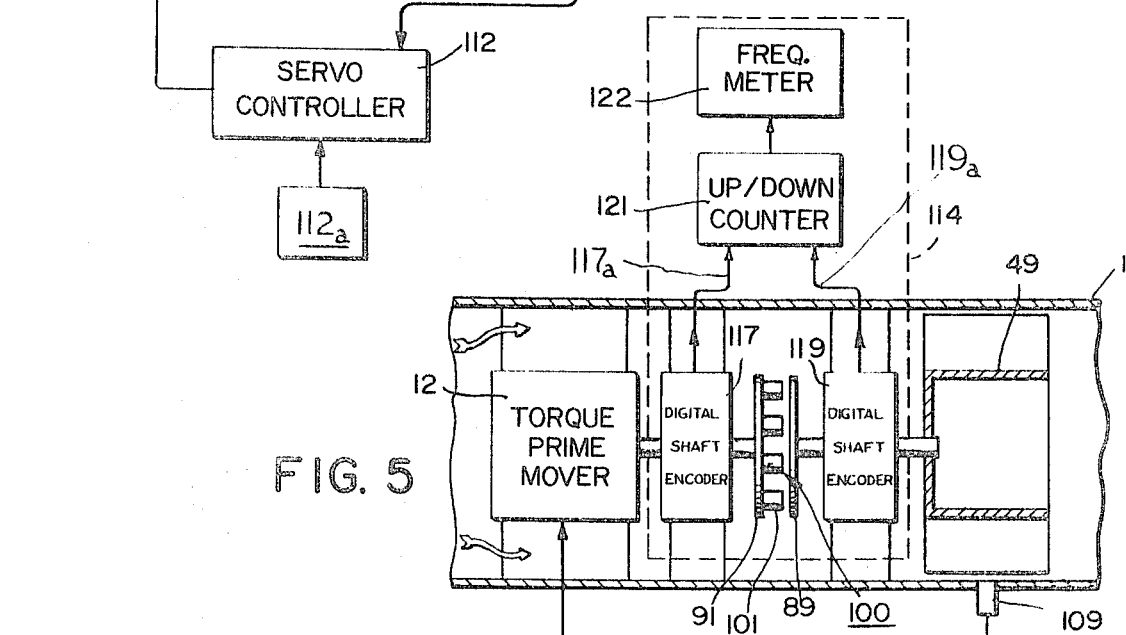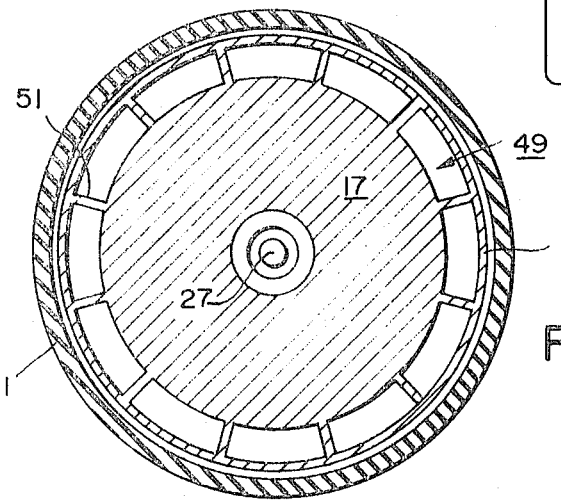

3,613,450
FLUID MASS FLOWMETER
Philip K. Bodge, 45 Abbot St., Andover, Mass. 01810
Filed Apr. 2, 1968, Ser. No. 718,051
Int. Cl. G01f 1/10
U.S. Cl. 73—231 M                                   12 Claims

ABSTRACT OF THE DISCLOSURE

A fluid mass flowmeter of the angular momentum type utilizes a variable-speed servomotor to drive a fluid-accelerating impeller at a constant speed through a translating unit which causes the torque available at the servomotor to develop a constant-speed output while concurrently providing a variable-speed output the velocities of which are proportional to mass flowrate and the total excursions of which are proportional to mass quantity.

BACKGROUND OF THE INVENTION

The present invention relates to mass flow measuring apparatus, and, more particularly, to improved devices especially well suited for measuring mass quantity as well as mass rate of flow. Mass, or the number of pounds contained in a quantity of fluid is generally recognized as being a more useful measure than the number of gallons, or other volumetric measure, of the same quantity of fluid. By way of illustration, the heat content of any particular fuel oil is given in B.t.u. per pound and thus if the number of pounds of fuel are known, then the available energy contained in that quantity of fuel oil will also be known. Volumetric measurement of the same fuel oil, on the other hand, does not yield an accurate measure of the available energy because of the change of fuel density with temperature. The most accurate, and reliable mass flowmeters thus far reduced to practice have been of the "angular momentum" type. Examples of flowmeters of such type are found in United States Patents Nos. 2,814,949 and 3,056,291. Such flowmeters are well suited for the measurement of mass flow rate; however, for measurements of mass quantity, the rate signals must somehow be integrated. At the expense of additional costs and inaccuracies, rate signals may be integrated by way of ancillary apparatus which will overcome the deficiency that such flowmeters do not inherently afford signals characterizing mass quantity. The present invention likewise relates to mass flowmeters which are also of the angular momentum type, but is instead particularly well suited for measuring mass quantity as well as mass flow rate, and is especially advantageous in that it inherently provides both mass quantity and mass rate signals.

Earlier angular momentum type flowmeters, which produce only a mass flow rate signals, have included constant-speed motors connected to drive fluid impellers at constant speed, and have further included resilient restraining means, such as springs, for sensing the torques necessary to maintain constant impeller speed while flow rates vary; angular deflections of the spring are in such cases essentially proportional to mass flow rate. In providing both mass flow rate and mass quantity signals in accordance with one practice of my present invention, a variable-speed motor, such as a conventional type of servomotor, is utilized to drive a fluid impeller at constant speed via a device including an eddy-current unit angular velocities of which are proportional to torques, this device at the same time providing a revolving member the angular velocities of which are proportional to the mass flow rate through the fluid impeller, and the total revolutions of which member are also proportional to the mass quantities of fluid which have traversed the impeller.

Accordingly, it is an object of this invention to provide an improved mass flowmeter of the type wherein the angular velocity of a revolving member is responsive to the mass rate of fluid flow.

Another object of this invention is to provide a mass flowmeter of a type wherein the total number of revolutions of a revolving member are responsive to the total quantity of fluid which has passed through the impeller.

A further object of this invention is to provide an improved flowmeter of a unique type wherein the mass flow rate and the mass quantity signals are substantially free of viscosity error.

It is another object of this invention to provide an improved flowmeter wherein the mass flow rate and the mass quantity signals are independent of inaccuracies due to the non-linearities of resilient deflectable or deformable devices such as springs or strain gages.

It is a further object of this invention to provide an improved flowmeter wherein mass flow rate and/or total mass quantity are advantageously measured with fluid flow occurring in either of opposite directions of flow through a conduit.

Another object of this invention is to provide improved flowmeters wherein the mass rate and mass quantity signals are substantially free of position error due to pendulosity, or static unbalance, of metering members.

A yet further object of this invention is to provide a unique flowmeter wherein mass rate and mass quantity output signals are highly immune to effects of vibration about any axis.

Still another object of this invention is to provide a flowmeter of improved structure wherein the metering provisions are rugged and relatively simple and exhibit niceties of construction which promote reliable and accurate operation over an extended service life.

SUMMARY

By way of a summary statement of practice of this invention in one of its aspects, there is provided a mass flowmeter comprising a casing adapted to be coupled in a fluid conduit, a fluid-accelerating impeller rotatably supported within the casing, and a variable-speed servomotor arranged to drive the impeller at constant angular velocity by way of an eddy-current braking device whose angular velocity is proportional to torque. In accordance with a preferred embodiment of the invention, an imput shaft of a gear differential is connected to be driven by the variable-speed servomotor, and the fluid-accelerating impeller is connected to be driven by an output shaft of the gear differential. An intermediate element, or spider, of the gear differential is connected for rotation with a non-magnetic, electrically-conductive eddy current brake disc; magnets fixedly attached to the flowmeter casing are arranged to induce eddy currents in the disc when the disc rotates relative to the magnets, thereby developing a reactive torque proportional to the angular velocity of the disc. A suitable transducer, or pick-off, senses angular velocities of the impeller, and velocity-related signals from this pick-off are fed into a comparitor which controls a servo amplifier causing the variable-speed motor to maintain constant impeller velocity. Angular velocities of a metering shaft, with which the differential spider and the eddy-current disc are fixed, are directly proportional to the mass flow rate, and the number of revolutions turned by this metering shaft are directly proportional to the total mass quantity of fluid which has traversed the impeller.

BRIEF DESCRIPTION OF THE DRAWINGS

A more detailed description of preferred embodiments of this invention follows with reference to the accompanying drawings, in which:

FIG. 2 is a partial longitudinal sectional view of one portion of a flowmeter which is otherwise like that of FIG. 1;

FIG. 3 is a schematic representation of a mass flowmeter embodying features of the present invention;

FIG. 4 is a further schematic representation of features of the present invention;

FIG. 5 presents another schematic representation of features of this invention; and FIG. 6 is a lateral cross-sectional view of the device of FIG. 1, taken along section line 6—6 in FIG. 1.

DESCRIPTION OF THE PREFERRED EMBODIMENTS

Figure 1:
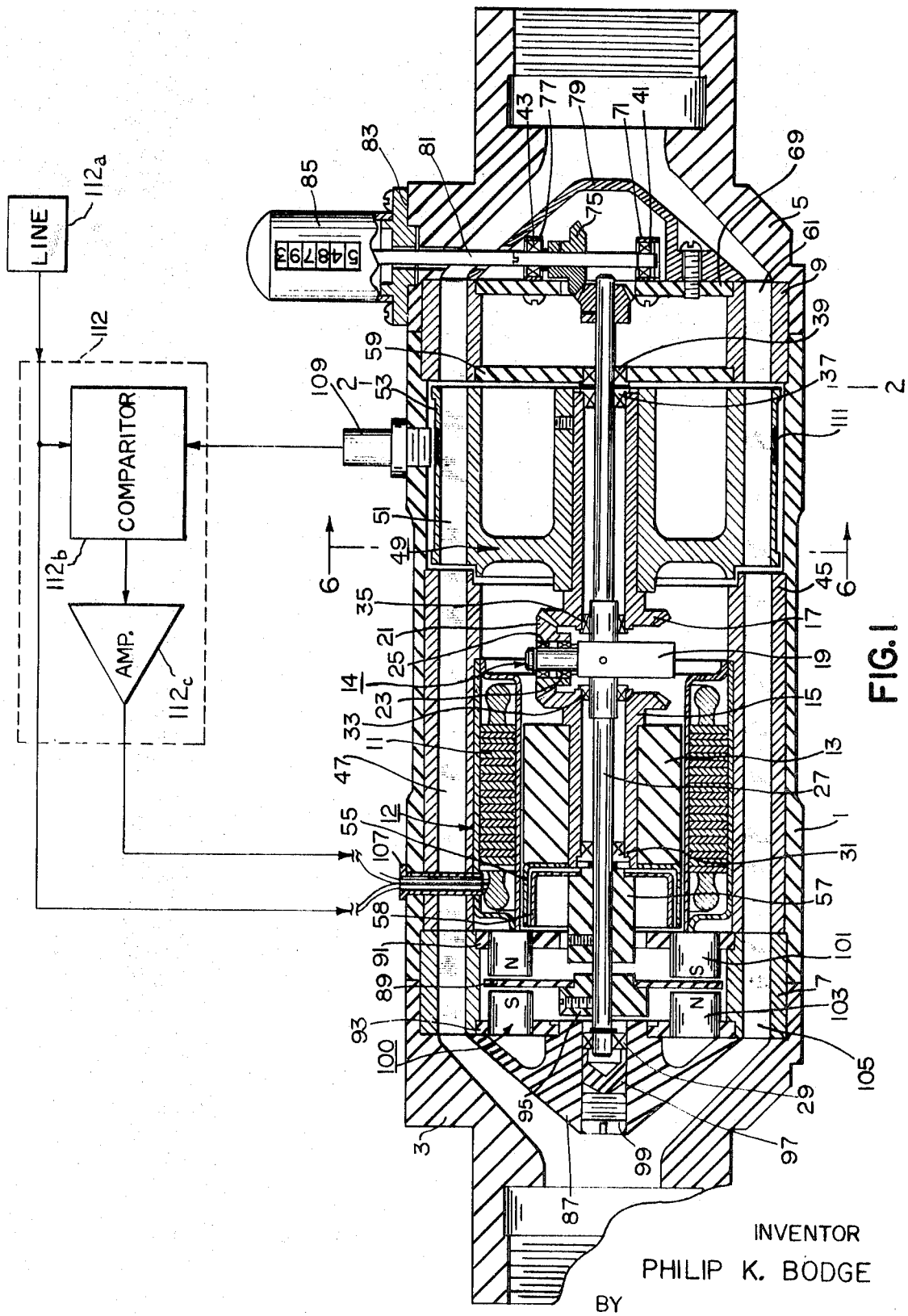
FIG. 1 is a longitudinal cross-sectional view of a mass flowmeter in accordance with teachings of the present invention.

The flowmeter shown in FIG. 1 includes a casing 1 to which are attached end housings 3 and 5. An internal support 7 is rigidly attached to the casing 1 and includes concentric inner and outer ring portions separated by a plurality of equally-spaced supports in the form of straight axial vanes 105 which also serve as flow straighteners. Stationary magnet assemblies 91 and 93, comprising soft iron discs into which a plurality of equally spaced permanent magnets 101 and 103 are inserted, form part of an eddy-current brake unit 100 concentric with support 7. Magnet assembly 93 serves also as part of the support for a faired flow director 87 which, in turn, supports main bearing 29. Support 9 is generally similar to support 7, but is associated with bearing plates 59 and 69. Plate 59 serves to mount a main bearing 39, while plate 69 supports a bearing 43 and its hanger 77 as well as a bearing 41 and its hanger 71. Faired flow director 79 is also fixed with plate 69. A motor housing 45, rigidly fixed to the casing, includes concentric inner and outer rings separated by a plurality of straight axial vanes 47. The sealed stator 11 of a variable-speed electric servomotor 12 is fitted tightly within the bore of the inner ring of the motor housing 45. A revolutions counter 85 is mounted to end housing 5, and is sealed fluid-tight by gasketing 83. Counter shaft 81 is rotatably mounted on bearings 41 and 43 which are held in bearing hangers 71 and 77.

A fluid-accelerating impeller 49 for the flowmeter is shown in the form of a thin outer shroud ring 53 separated from an inner ring and hub by a plurality of straight axial vanes 51; FIG. 6 provides a sectional view of this impeller. Gears 15, 17, and 21 comprise a bevel gear differential 14. Gear 15 is supported by metering shaft 27 but is mounted for separate rotation on bearings 31 and 33. Likewise gear 17 is supported on metering shaft 27 but is mounted for separate rotation on bearings 35 and 39. The intermediate or so-called "spider" gear 21 meshes with both gears 15 and 17 and is mounted for rotation on bearings 23 and 25. Rotor 13 of the variable-speed servomotor 12, and the viscosity-compensating drum 55, are fixed to the hub of gear 15. Fluid-accelerating impeller 49 is fixed to the hub of gear 17. Spider unit 19, which carries spider gear 21, is fixed to the metering shaft 27, as are also the hub 95 of the electrically-conductive non-magnetic eddy-current brake disc 89 and the hub 57 of viscosity-compensating drum 58. Metering shaft 27 is mounted for rotation in the aforementioned main bearings 29 and 39 and drives the revolutions-counter shaft 81 by way of bevel gears 73 and 75. End play of the metering shaft 27 is eliminated by adjustment of the screw 99 against end cap 97. The pick-off, or transducer, 109, which senses impeller velocity is fixed to the flowmeter casing 1 and is a known electromagnetic type arranged in close proximity to a magnetic ring element 111 fixed for rotation with the impeller shroud 53. Electrical signals from the pick-off 109 are delivered to an electronic servo control system 112 which regulates the speed of the variable-speed motor 12 such that the impeller speed is in turn maintained at substantially a pre-determined constant value. Seal tube 107 allows the leads, from the sealed variable-speed servomotor stator 11, to be brought to the outside of the flowmeter casing for controlled excitation by the servo system 112.

In operation of the flowmeter of FIG. 1, the casing 1 is connected in a fluid conduit for entrance of fluid either through end support flow straightener 7 or 9, as desired, it being an advantage that the flowmeter is operative when fluid flow occurs in either of the two possible directions therethrough. Control of the servomotor stator 11 and rotor 13 in response to operation of the pick-off 109 and servo system 112 causes the impeller to be rotated to impart a constant angular velocity to the fluid flowstream passing therethrough, about the longitudinal axis of the flowmeter. This produces a net change in flowstream angular momentum which will be directly proportional to the mass flow rate. Reaction torques, produced by the changes in flowstream angular momentum, cause the spider unit 19 to rotate the metering shaft 27 in a direction opposite to that of the impeller rotation, at angular velocities sufficient for the eddy-current disc 89 to develop the same levels of reaction torques in conjunction with the fixed magnets 101 and 103. Because the speed-torque characteristics of the translating device including eddy-current disc 89 and the cooperating magnets 101 and 103 are substantially linear, i.e., angular velocity is proportional to torque; angular velocities of the metering shaft 27 must in turn be proportional to mass flow rates and, hence, the total numbers of revolutions turned must be proportional to the total mass quantities, or number of pounds of fluid which have traversed the impeller. The numbers of revolutions turned by the metering shaft 27 are conveniently totalized by the revolutions counter 85, driven by metering shaft 27 by way of bevel gears 73 and 75 and counter shaft 81. Indications of mass rate, rather than mass quantity are readily obtained merely by replacing the revolutions counter 85 by a tachometer indicator, or by adding such an indicator for drive by a shaft such as 81.

The revolving reaction member 27, and, hence, both mass rate and mass quantity signals, will be free of non-linearities commonly encountered in use of resilient deflectable or deformable reaction members, such as springs or strain gages. Further, the revolving metering shaft 27 will be substantially free of error due to pendulosity or of position mounting error. Those skilled in the art will also recognize that the eddy-current-damped revolving metering shaft 27 will be significantly less subject to vibration error than are movable metering members which are restrained by highly reactive deflectable members such as springs.

Viscous materials in the fluid flowstream will cause viscous drag torque to be developed between the inner bore of the flowmeter casing 1 and the outer shroud ring 53 of the constant speed impeller 49. The torque thus produced is not a direct function of mass flow rate, and will therefore cause the desired signal to be in error by some amount. It is highly desirable that this type of error be minimized, and, to this end, the viscosity compensation drums 55 and 58 are utilized in the structure of FIG. 1. Both the drum 55, attached to the servomotor rotor 13, and the drum 58, attached to the metering shaft 27, rotate with variable angular velocity. However, they always differ in angular velocity with respect to each other by an amount proportional to the constant velocity of impeller 49. The direction of the viscous drag torque thus developed between the drums 55 and 58 is opposite to that of the viscous drag torque developed between the impeller 49 and casing 1 and hence, a proper selection of clearances and areas of the viscous drag torque producing members suffices to cause the viscous torques to be nulled, thereby substantially eliminating viscosity errors from the measurement signals.

FIG. 2 is an embodiment of this invention showing how both mass flow rate and mass quantity signals may be obtained in one practice. FIG. 2 is a partial longitudinal sectional view showing only that part of the flowmeter which is to the right of the section line 2—2 of FIG. 1. It may be assumed for purposes of this discussion that the parts, not shown, to the left of section line 2—2 are substantially the same as in FIG. 1. In FIG. 2, a digital shaft encoder 86 has replaced the revolutions counter 85 of FIG. 1; specifically, the embodiment is one involving known forms of reed switches 86a associated with the rotated magnets 86b. The output of this shaft encoder, 86, is fed into appropriate well known forms of scalers 88 and 90, and the outputs from scalers 88 and 90 are respectively fed into the totalizing pulse counter 92 and the frequency meter 94.

Digital shaft encoder 86 can be of any convenient type such as a known magnetic, reluctance, or optical encoder. Its primary function is to generate a fixed number of pulses per revolution of the metering shaft 27. The rate at which pulses are generated by that encoder will be proportional to mass flowrate, and the total number of pulses generated by the encoder will be proportional to mass quantity. A known form of frequency meter 94 is provided to measure and display the pulse repetition rate of the signal from the encoder 86. Likewise, a known form of totalizing pulse counter 92 is provided to count and display the total number of pulses received from that encoder. The function of scalers 88 and 90 is simply to apply a suitable proportionality factor to the encoder pulse train so that the totalizing pulse counter 92 and the frequency meter 94 respectively display mass quantity in pounds, and mass flowrate in pounds per hour, or other convenient units.

Various constructions embodying the principles of this invention can advantageously be understood through reference to the simplified schematic representations appearing in FIGS. 3, 4, and 5 where, insofar as is practical, the same numerals used before are employed as a convenience to designate elements functionally alike.

FIG. 3 shows a casing 1 enclosing a fluid accelerating impeller 49 through which the fluid flowstream must pass. A variable speed servomotor 12 is arranged to drive the fluid accelerating impeller 49 by way of translator means 114. Translator means 114 herein comprises a bevel gear differential 14 having a bevel gear 15 driven by servomotor 12, a bevel gear 17 driving impeller 49, a bevel spider gear 21 meshing with both gears 15 and 17, and an eddy current brake 100. The eddy current brake 100 consists of a non-magnetic electrically-conductive disc 89 attached to the differential spider unit 19, and fixed magnets 101 and 103 held in magnet plates 91 and 93. The servomotor 12 is powered from a suitable line source by way of servo control system 112, which receives an impeller velocity signal from pick-up 109.

Operation of the arrangement appearing in FIG. 3 is generally the same as that of FIG. 1, wherein energy is taken from the line 112a or alternative reference source and applied to the servomotor 12 in amount determined by servo controller 112, the latter being responsive to signals received from the impeller pick-up 109. Thus, if the impeller speed tends to depart from a predetermined value, the error is detected in the comparitor portion 112b (FIG. 1) of controller 112 thereby causing it to modulate the energy supplied to the servomotor 12, via an amplifier 112c (FIG. 1) for example, in the correct sense to reduce the error in impeller speed, and therefore maintain a substantially constant impeller speed. The impeller 49 is coupled to be driven by the motor 12 by way of the translator means 114. With the impeller revolving at its predetermined constant speed, the rate at which the flowstream angular momentum is changed, and thus the impeller reaction torque, is directly proportional to the mass rate of fluid flow. It will be appreciated that torque can be developed between gears 15 and 17 of differential 14 only in substantially precise proportion to the restraints applied to the differential spider 19 or spider gear 21. The spider restraint herein is an eddy-current brake 100 having characteristics such that its restraining torque is directly proportional to the relative velocity between the disc 89 and the fixed magnets 101 and 103. Impeller reaction torque, the eddy current brake restraining torque, and the servomotor driving torque are all in series, and therefore must all be directly proportional to the mass rate of fluid flow. However, of these torque developing members, only the eddy current brake disc 89 revolves with a speed which is directly proportional to mass rate of fluid flow, and has an angular rotation which is directly proportional to mass quantity. It is the gear differential action which subtracts the constant impeller speed from the variable motor speed to produce the spider speed which, due to the liner speed-torque characteristic of the brake 100, is directly proportional to mass flow rate. Translator means 114 thus serves to operate to convert the torque available at the motor shaft to a constant impeller speed while simultaneously providing signals, i.e., signals characterizing angular velocity and angular rotation of the spider, which are directly proportional to mass flow rate and mass quantity and which are developed by way of a suitable pick-off and associated counter, such as one involving an optically- or inductively-actuated pick-off of known type (not shown).

FIG. 4, depicting another embodiment is also a simplified schematic representation, and shows a conduit 1 surrounding a fluid-accelerating impeller 49 through which the fluid flowstream must pass. Variable-speed servomotor 12 is arranged to drive the impeller 49 by way of translator means 114 comprising an eddy-current clutch 100, an analog shaft encoder 116 driven by motor 12, an analog shaft encoder 118 driven by the shaft of impeller 49, and an electrical differential 120 connected to be electrically driven by the two analog shaft encoders 116 and 118. The eddy-current clutch comprises a magnetic disc 91, carrying magnets 101, driven by servomotor 12, and a non-magnetic electrically conductive drag disc 89 arranged to drive the impeller 49. As in the forgeoing constructions, the servomotor 12 is electrically energized from a suitable reference source, such as one of fixed frequency, by way of servo controller 112 which receives an impeller-velocity signal from the pick-off 109.

In operation, the servomotor 12 of FIG. 4 is energized by the servo controller 112 which so controls the source of electrical energy, repsonsive to the impeller velocity signal from pick-off 109, that it maintains a substantially constant speed of rotation of the impeller. The impeller is coupled to be driven by the motor 12 by way of translator means 114. When the impeller 49 is revolving at its predetermined constant speed, the rate at which the flowstream angular momentum is changed, and hence the impeller reaction torque, will be directly proportional to the mass rate of fluid flow. The torque developing members, impeller 49, eddy current clutch 100, and servomotor 12 are all in series, hence the torque developed by each of these members will be directly proportional to mass flowrate. The speed-torque characteristics of the eddy current clutch are linear, and thus the angular velocity of the clutch disc 89 relative to the magnets 101 will be directly proportional to mass flowrate, and the total angle turned by the disc 89 relative to the magnets 101 will be directly proportional to mass quantity. The analog shaft encoder 116 generates a signal which is a function of the angular velocity of the motor driven magnet assembly 91, and thereby excites the stator of the electrical differential 120 to produce a rotating stator field in a given direction. The analog shaft encoder 118 generates a signal which will be a function of the angular velocity of the disc 89, thereby exciting the rotor of the known form of electrical differential 120 which is connected to produce a rotating rotor field in a direction opposite the stator field. Therefore the shaft of the electrical differential will revolve with an angular velocity proportional to the difference between the angular velocity of the motor 12 and the impeller 49, which has been shown to be proportional to mass flowrate, and the total angle turned is proportional to mass quantity. Translator means 114 thus serves to operate such that the controlled torque available at the motor 12 is converted to a constant impeller speed while concurrently it produces signals proportional to mass flowrate and mass quantity.

FIG. 5 shows another embodiment of the present invention, which, with the exceptions herein noted, may otherwise be considered substantially the same as the device of FIG. 4. In FIG. 5, a digital shaft encoder 117 is connected to the shaft of torque prime mover 12 which drives eddy current magnet assembly 91. Output pulse train from encoder 117 is connected to the "up" channel 117a of a conventional "up/down" counter 121 of a known form. Digital shaft encoder 119 is connected to the shaft of impeller 49 which is arranged to be driven by eddy current disc 89. Output pulse train from encoder 119 is connected to the "down" channel 119a of counter 121. The difference pulse train, as processed by the counter 121, is applied to the input of the frequency meter 122.

Operation of the arrangement appearing in FIG. 5 is essentially the same as that for the arrangement of FIG. 4, except that the velocity of the shaft driving magnet assembly 91 is now digitally quantized by encoder 117 to produce a pulse train having a repetition rate proportional to the angular velocity of eddy-current clutch magnet assembly 91. Likewise, encoder 119 quantizes the revolutions, turned by the impeller shaft driven by eddy current disc 89, and produces a pulse train having a repetition rate proportional to the angular velocity of the eddy-current clutch drag disc 89. The up/down counter operates to subtract the pulses, received from encoder 119 from the pulses received from encoder 117, and to display this difference on a counting register, the number displayed being proportional to mass quantity. The repetition rate of the difference pulse train, as processed by counter 121, is applied to the input of the frequency meter 122 which displays a readout proportional to mass flowrate. Translator means 114 thus serves to convert the controller torque, available at the prime mover 12, to a constant impeller speed, while simultaneously producing signals proportional to mass flowrate, and mass quantity.

Although mechanical differential arrangements are utilized in the translators of the flowmeters of FIGS. 1 and 3, it will be perceived that these have counterparts, in differential arrangements of the FIGS. 4 and 5 embodiments, which are not wholly mechanical. It will also be recognized that angular rotations of the prime mover, such as the illustrated electrical servomotor, involve velocities related to mass flowrate and total revolutions related to flow mass quantity, although direct relations are established only when constants, such as those representing constant speed of rotation of the impeller, are first subtracted. Inasmuch as the impeller speed is maintained substantially fixed, the desired constants for subtraction can be derived elsewhere, for example from a separate constant-speed synchronous motor or from a stable electrical-signal generator, albeit at the expense of accessory equipment for that purpose.

Those skilled in the art will appreciate that various modifications and alternative embodiments of the structures herein described may be made without departing from the spirit or scope of the invention in its broader aspects, and, accordingly, it should be understood that the foregoing description and drawings are intended to be taken in an illustrative sense, for purposes of disclosure, and not as necessarily limiting the invention.

What I claim as new and desire to secure by Letters Patent of the United States is:

1. Mass flowmeter apparatus of the angular momentum type comprising a casing for conducting fluid flow, a rotatable fluid-accelerating impeller within said casing, a variable-speed motor, means sensing angular velocity of said impeller, controller means controlling energy supplied to said motor responsive to said means sensing angular velocity of said impeller, translator means responsive to torques available from said motor and producing substantially constant angular velocity rotation of said impeller, said translator means further including means characterizing differences between angular velocities of said motor and impeller, flow indicating means, and means actuating said flow indicating means in accordance with said differences between said angular velocities.

2. Mass flowmeter apparatus as set forth in claim 1 wherein said flow indicating means comprises means producing indications which are directly related to said differences between said angular velocities and which are therefore substantially directly proportional to mass flowrate.

3. Mass flowmeter apparatus as set forth in claim 1 wherein said flow indicating means comprises means producing indications which are directly related to totalized differences between said angular velocities and which are therefore substantially directly proportional to flow mass quantity.

4. Mass flowmeter apparatus as set forth in claim 1 wherein said flow indicating means includes a revolvable output signalling member, and wherein said translator means simultaneously characterizes said differences between said angular velocities by revolving said output signalling member at angular velocities directly related to said differences between said angular velocities, whereby said angular velocities of said member are substantially directly proportional to mass flowrate and total rotation of said member is substantially directly proportional to flow mass quantity.

5. Mass flowmeter apparatus as set forth in claim 1 wherein said translator means includes eddy-current brake means having relatively movable magnet and electrically-conductive elements preserving the angular velocity of said impeller substantially constant responsive to torques from said motor.

6. Mass flowmeter apparatus of the angular momentum type comprising a casing adapted to be coupled into a fluid conduit, a fluid-accelerating impeller within said casing, variable-speed prime mover means, means sensing angular velocity of said impeller, servo controller means regulating the energy supplied to said prime mover means responsive to said means sensing angular velocity of said impeller, translator means coupling said prime mover means in driving relation to said impeller and transforming torques available from said prime mover means into substantially constant impeller angular velocity, said translator means further including means generating a signal output in the form of an electrical pulse train having a pulse repetition rate substantially directly proportional to mass flow rate, the total number of pulses in said train being substantially directly proportional to flow mass quantity, and flow indicating means responsive to said pulses.

7. Fluid mass flowmeter apparatus of the angular momentum type comprising a rotatable fluid-accelerating impeller, a motor, means including a gear differential connecting said motor in driving relation to said impeller, reaction means including a rotatable portion and exhibiting torques directly proportional to angular velocity of said rotatable portion thereof, means connecting said rotatable portion of said reaction means for rotation by a member of said gear differential, closed-loop velocity servo means regulating said impeller speed to a predetermined constant value, whereby angular velocities of said portion of said reaction means are substantially directly proportional to mass flow rate and total revolutions thereof are substantially directly proportional to mass flow-quantity, and flow indicating means responsive to rotation of said rotatable portion of said reaction means.

8. Fluid mass flowmeter apparatus as set forth in claim 7 wherein said gear differential includes a first gear rotated in driven relation to said motor, a second gear rotated in driving relation to said impeller, and a spider gear rotating a spider member in driving relation to a rotatable portion of an eddy-current brake having relatively rotatable magnet and electrically-conductive portions.

9. Mass flowmeter apparatus of the angular momentum type comprising a casing for conducting fluid flow, a fluid-accelerating impeller mounted for rotation within said casing, a drive motor for said impeller, a translating unit including driving and driven portions and means developing torques which are proportional to relative velocities between said driving and driven portions, means connecting said impeller in driven relation to said motor through the intermediary of said unit means sensing angular velocities of said impeller, servo controller means responsive to said sensing means controlling said drive motor speed to maintain substantially constant angular velocity of rotation of said impeller, whereby differences between angular velocities of said impeller and motor are substantially linearly related to mass flowrate and totals of said differences are substantially linearly related to flow mass quantity, and measuring means responsive to the differences between said angular velocities.

10. Mass flowmeter apparatus as set forth in claim 9 wherein said unit comprises an eddy-current brake developing said torques.

11. Mass flowmeter apparatus as set forth in claim 10 wherein said unit comprises a gear differential including said eddy-current brake as restraint to rotation one of the three rotatable spider and gear elements of said differential, the other two of said elements being connected for rotation with said motor and said impeller, respectively.

12. Bi-drectional mass flowmeter apparatus of the angular momentum type comprising a casing for conducting fluid flow there-through, a rotatable fluid-accelerating impeller having axially-straight vanes mounted within said casing, flow-straightening members having axially-straight vanes closely adjacent opposite axial ends of said impeller, a variable-speed motor for driving said impeller; revolvable eddy-current brake means, a differential connecting said motor in driving relation to said impeller and said brake, closed-loop velocity servo means regulating said impeller speed to a predetermined constant value, viscosity compensating means including a first member connected in driven relation to said motor and a second member revolvably connected with said brake closely adjacent said first member, said first and second members thereby developing torque due to viscous fluid shear therebetween which is substantially equal and opposite to viscous torque developed by fluid shear between said casing and said impeller, means responsive to angular velocity of said revolvable brake for indicating mass flow rate, and means responsive to the number of revolutions turned by said brake for indicating total flow mass quantity.

References Cited

UNITED STATES PATENTS

| | | | |
|---|---|---|---|
| 2,714,310 | 8/1955 | Jennings | 73—194 |
| 2,857,761 | 10/1958 | Bodge | 73—194 |
| 2,914,943 | 12/1959 | Ballard | 73—194 |
| 2,940,309 | 6/1960 | Karlby | 73—194 |
| 3,005,341 | 10/1961 | Benson | 73—194 |
| 3,043,138 | 7/1962 | Waugh | 73—194 |
| 3,060,736 | 10/1962 | Maze | 73—194 |
| 3,089,336 | 5/1963 | Waugh et al. | 73—194 |

FOREIGN PATENTS

| | | | |
|---|---|---|---|
| 160,600 | 11/1962 | U.S.S.R. | 73—194 |

JERRY W. MYRACLE, Primary Examiner